United States Patent
Reimann et al.

(10) Patent No.: US 11,310,640 B2
(45) Date of Patent: Apr. 19, 2022

(54) METHOD FOR VEHICLE-TO-VEHICLE COMMUNICATION

(71) Applicant: VOLKSWAGEN AKTIENGESELLSCHAFT, Wolfsburg (DE)

(72) Inventors: Daniel Reimann, Braunschweig (DE); Guillaume Jornod, Berlin (DE); Andreas Pfadler, Berlin (DE)

(73) Assignee: Volkswagen Aktiengesellschaft

( * ) Notice: Subject to any disclaimer, the term of this patent is extended or adjusted under 35 U.S.C. 154(b) by 150 days.

(21) Appl. No.: 16/795,331

(22) Filed: Feb. 19, 2020

(65) Prior Publication Data
US 2020/0267519 A1 Aug. 20, 2020

(30) Foreign Application Priority Data

Feb. 20, 2019 (EP) ..................................... 19158381
Apr. 29, 2019 (EP) ..................................... 19171569

(51) Int. Cl.
*H04W 4/46* (2018.01)
*H04L 43/0882* (2022.01)
(Continued)

(52) U.S. Cl.
CPC ............ *H04W 4/46* (2018.02); *H04B 7/0413* (2013.01); *H04B 7/0626* (2013.01); *H04B 7/086* (2013.01);
(Continued)

(58) Field of Classification Search
None
See application file for complete search history.

(56) References Cited

U.S. PATENT DOCUMENTS 9,154,284 B1\* 10/2015 Park ........................ H04L 5/006
9,907,086 B2 2/2018 Bai et al.
(Continued)

FOREIGN PATENT DOCUMENTS

CN 109076371 A 12/2018
CN 109150478 A 1/2019
(Continued)

OTHER PUBLICATIONS

Office Action for Korean Patent Application No. 10-2020-0020435; dated Nov. 24, 2020.
(Continued)

*Primary Examiner* — Rebecca E Song
(74) *Attorney, Agent, or Firm* — Barnes & Thornburg LLP (57) ABSTRACT

A method for Vehicle-2-Vehicle communication of a transportation vehicle that enables the transportation vehicle to selectively forward a message concerning channel quality received from another transportation vehicle based on detection of channel quality of the transportation vehicle. A first transportation vehicle receives a first message from a second transportation vehicle including first channel quality information (CQI) related to a first position indicated in the message; compares the first CQI with a second CQI related to a second position, wherein the second CQI is determined by the first transportation vehicle; and selectively transmits a second message having the first CQI and/or the second CQI to a third transportation vehicle based on the comparison of the first CQI and the second CQI.

13 Claims, 2 Drawing Sheets

(51) Int. Cl.
  *H04W 24/08* (2009.01)
  *H04W 28/02* (2009.01)
  *H04B 17/373* (2015.01)
  *H04W 4/40* (2018.01)
  *H04B 7/0413* (2017.01)
  *H04B 7/06* (2006.01)
  *H04B 7/08* (2006.01)
  *H04L 1/00* (2006.01)
  *H04W 4/02* (2018.01)
  *H04W 16/28* (2009.01)
  *H04W 24/10* (2009.01)
  *H04W 64/00* (2009.01)
  *H04W 72/12* (2009.01)

(52) U.S. Cl.
  CPC ......... *H04B 17/373* (2015.01); *H04L 1/0026* (2013.01); *H04L 43/0882* (2013.01); *H04W 4/027* (2013.01); *H04W 4/40* (2018.02); *H04W 16/28* (2013.01); *H04W 24/08* (2013.01); *H04W 24/10* (2013.01); *H04W 28/0273* (2013.01); *H04W 64/006* (2013.01); *H04W 72/1231* (2013.01)

(56) References Cited

U.S. PATENT DOCUMENTS

| | | | |
|---|---|---|---|
| 2003/0091017 A1 | 5/2003 | Davenport et al. | |
| 2010/0034114 A1* | 2/2010 | Kim | H04L 1/0029 370/252 |
| 2011/0044220 A1 | 2/2011 | Park et al. | |
| 2011/0176477 A1* | 7/2011 | Lee | H04B 7/15592 370/315 |
| 2015/0124895 A1* | 5/2015 | Park | H04W 4/027 375/260 |
| 2016/0316486 A1* | 10/2016 | Bai | H04L 47/32 |
| 2018/0115889 A1 | 4/2018 | Todorovic et al. | |
| 2018/0261097 A1 | 9/2018 | Jiang et al. | |
| 2020/0084119 A1* | 3/2020 | Zackariya | G06F 9/546 |
| 2020/0119836 A1 | 4/2020 | Lyu et al. | |
| 2021/0250118 A1* | 8/2021 | Roth-Mandutz | H04L 41/0896 |
| 2021/0258743 A1* | 8/2021 | Boban | H04W 4/46 |

FOREIGN PATENT DOCUMENTS

| | | |
|---|---|---|
| JP | 2005156169 A | 6/2005 |
| KR | 101506598 B1 | 3/2015 |
| KR | 101909274 B1 | 10/2018 |
| WO | 2017206100 A1 | 12/2017 |
| WO | 2018164793 A1 | 9/2018 |

OTHER PUBLICATIONS

Sanguesa et al.; RTAD: A real-time adaptive dissemination system for VANETs; Computer Communications; 2015; vol. 60; pp. 53-70.
3GPP TS 25.300; 3rd Generation Partnership Project; Technical Specification Group Radio Access Network; V14.0.0; Sep. 2016.

* cited by examiner

METHOD FOR VEHICLE-TO-VEHICLE COMMUNICATION

PRIORITY CLAIM

This patent application claims priority to European Patent Application Nos. 19158381.4, filed 20 Feb. 2019, and 19171569.7, filed 29 Apr. 2019, the disclosures of which are incorporated herein by reference in their entireties.

SUMMARY

Illustrative embodiments relate to a method for selectively forwarding channel quality indicating, CQI, messages between transportation vehicles, particularly for selectively forwarding shared channel quality, SCQ, messages and/or cooperative communication message, CCM, between transportation vehicles. Illustrative embodiments further relate to a transportation vehicle configured for performing such a method, particularly to a transportation vehicle comprising a control unit configured for performing such method and a computer program for enabling a computer to perform such method.

BRIEF DESCRIPTION OF THE DRAWINGS

Disclosed embodiments are described in detail with reference to the attached drawings in which.

DETAILED DESCRIPTION

Automotive applications and mobile communications become more and more entangled, particularly due to the increasing interest in autonomous driving that requires larger amounts of data when compared to conventional driving. These data amounts are provided partially by the transportation vehicle itself (i.e., by sensors thereof) and partially via an air interface. Via the air interface either a vehicle to vehicle, V2V, communication or a vehicle to everything, V2X, communication is carried out, the latter including communication with road side units, RSUs.

Where V2X communication is carried out via a cellular mobile network, such as, e.g., a LTE or 5G communication network, it is referred to as cellular-V2X, C-V2X. The V2V and C-V2X communications can be carried out in a LTE or 5G network with sidelink carries at the PHY layer (PC5 sidelink) or based on WLAN communication according to IEEE 802.11p standard.

With an increasing amount of modern transportation vehicles using V2V and V2X communication, the number of users of these communication protocols is on the rise. Due to the user numbers and increasingly complex applications, the amount of transmitted data will rise continuously. US 2018/0261097 A1 disclose a method of a first transportation vehicle that determines, through sensors of the first transportation vehicle, second and/or third transportation vehicle information associated with a second and/or third transportation vehicle, respectively, and that generates and transmits a safety message that includes the determined second and/or third transportation vehicle information. In this method, channel congestion may be considered in determining whether to include only second transportation vehicle information or also third transportation vehicle information in the safety message. However, the transportation vehicle information itself comprise a position, a velocity, an acceleration, a heading, a brake status, a transportation vehicle size, a path history, a path prediction, or exterior light states of the second and/or third transportation vehicle but no information on channel congestion.

However, due to limited bandwidth and data rate the increase in data might come along with a deterioration of channel quality and thus quality of service, QoS, of communication links.

However, particularly with respect to autonomous driving the QoS of the radio links might be directly related to the safety of the automated processes and hence the driver's safety. Hence, limiting data throughput via the radio link is one of the challenges of V2V and V2X.

However, while on one hand there is an interest to utilize V2V communication to supplement V2X communication in that transportation vehicles might share information on network coverage etc., to facilitate QoS prediction and/or to schedule application critical data upload or download, on the other hand the benefit of such V2V sidelink communication is deteriorated, if the messaging related to such V2V communication would congest the radio channel itself.

US 2018/0115889 A1 is concerned with over-the-air, OTA, data transmission from a transportation vehicle backend system to a target transportation vehicle, wherein preferred geographical regions meeting or exceeding a certain QoS threshold are determined and data transmission to a transportation vehicle may be carried out when the transportation vehicle is within such a preferred geographical region. Although this method might be useful to improve user experience and reduce loss rates of data transmission it focuses solely on performance characteristic of the V2X communication.

Disclosed embodiments overcome or reduce at least some of the drawbacks of the prior art and provide a method for vehicle-to-vehicle communication that is suitable for reducing traffic on radio links that are utilized for V2X and V2V communication.

According to a first disclosed embodiment, a method for vehicle-to-vehicle, V2V communication is provided that enables a transportation vehicle to selectively forward a received message. The following operations are performed by a control unit of the transportation vehicle as well as by a communication module of the transportation vehicle, the latter may be under control of the control unit.

The disclosed method comprises receiving a first message from a second transportation vehicle (different from the first transportation vehicle), wherein the first message comprises first channel quality information, CQ, wherein the first CQI is related to a first position and wherein the first position is indicated in the first message. The first CQI may comprise the measurement of a received power of a signal received by the second transportation vehicle via a channel of a communication network, such as, e.g., a cellular network or a WLAN network. The first CQI may further comprise information on an error rate of the communication, such as, e.g., a packet error loss rate or a bit error rate. The first channel quality information, CQI, may further be configured similarly to a Quality of Service (QoS) Class Identifier, QCI, or a channel quality indicator, CQI, according to LTE-A but is however not limited to such an embodiment. The first transportation vehicle receives the message within a transmission area of the second transportation vehicle.

In the disclosed method, the transportation vehicle further performs the operation of comparing the first CQI with a second CQI, wherein the second CQI is related to a second position and wherein the second CQI is or has been determined by the first transportation vehicle. Therein, the format of the second CQI may be similar, particularly identical to the format of the first CQI. Where, the first CQI and the second CQI comprise a scalar value, the comparison may be carried out as a numerical comparison of these scalar values. Where, the first CQI and the second CQI comprise information in form of a vector or a matrix, the comparison may be carried out element-wise or by comparing a norm of the CQIs, e.g., a Euclidean norm. By comparing the first and second CQI, the transportation vehicle determines whether or not the channel quality indicated by the first CQI persists at or near the first location or changed. Further, the second CQI is determined by the first transportation vehicle in an identical or similar manner as the first CQI is determined by the second transportation vehicle, e.g., based on received power.

Further, in the disclosed method and in accordance with the comparison of the first CQI and the second CQI, the transportation vehicle selectively transmits a second message comprising the first CQI and/or the second CQI to a third transportation vehicle. In other words, the transportation vehicle forwards either the first message as a second message or transmits a second message comprising solely or additionally the second CQI, or transmits no message at all to the third transportation vehicle. Optionally, the transportation vehicle determines, by the comparison, whether rather the first CQI and/or the second CQI is interesting for the third transportation vehicle and transmits at least one of the first CQI and the second CQI, if the respective value is of interest to the third transportation vehicle and does not transmit the respective CQI value if it is of no interest for the third transportation vehicle as described in detail below. Hence, by carrying out the disclosed method, solely the amount of transmitted messages comprising CQI values can be adapted to the need and hence be reduced. Thus, congestion of shared channels used for transmitting such messages can be avoided.

According to of the disclosed embodiments, the second position is identical to the first position. In other words, the first transportation vehicle compares a second CQI that it measured itself for the same location for which the first CQI received from the second transportation vehicle was measured. Hence, the comparison yields an exact outcome on the channel quality for that location. Alternatively, the second position is within a predetermined range about the first position. In some disclosed embodiments, the transportation vehicles will measure CQI at specific, e.g., predefined, intervals, and hence the locations of measurement depend on these intervals. Hence, occurrence of CQIs measured for the exact same location might be rare and considering a predetermined range allows for carrying out the disclosed embodiments for many cases. Further, a region of interest, ROI, for channel quality (or a critical area) might change its position as described in detail below. Again, allowing a predetermined range around the first location allows covering such cases.

According to a disclosed embodiment, the first transportation vehicle transmits the first CQI and/or the second CQI to the third transportation vehicle if a difference between the first CQI and the second CQI is below a predetermined CQI threshold. Optionally, the first transportation vehicle transmits the first CQI and/or the second CQI to the third transportation vehicle only if a difference between the first CQI and the second CQI is below a predetermined CQI threshold. In other words, the first transportation vehicle transmits the second message solely if it determined, e.g., measured, a same or similar CQI for the same or a similar location as the second transportation vehicle, i.e., if a CQI at the location persists.

Optionally, the first transportation vehicle transmits (solely) the first CQI to the third transportation vehicle if a difference between the first CQI and the second CQI is below a first predetermined CQI threshold. Therein, the first CQI threshold is set such that it allows, e.g., for concluding that a critical area, i.e., an area with a CQI indicating a high channel load and/or low quality of service, QoS, remains at the same or a nearby location. In such case the first transportation vehicle transmits the first CQI received by the second transportation vehicle to the third transportation vehicle. In addition it might transmit the second CQI it measured itself and/or a mean value determined from both CQIs.

Alternatively, the first transportation vehicle transmits the second CQI to the third transportation vehicle if a difference between the first CQI and the second CQI is below a second predetermined CQI threshold. Therein, the second threshold may be higher than the first threshold. In such a case, the first transportation vehicle, e.g., determines that the critical area persists in principal but that characteristics of the critical area have changed, such as, e.g., the location and/or the CQI of such critical area. In other words, in such case the second CQI still indicates a high channel load and/or low quality of service, QoS, for the same or a similar location but the transportation vehicle determines that the second CQI is of more interest for the third transportation vehicle. This might be due to that the second CQI is more accurate or more significant for an actual or future location of the third transportation vehicle.

Optionally, the first CQI or the first message comprises information on a time of the measurement of the first CQI, i.e., a time stamp. Then if a difference between the first CQI and the second CQI is below a second predetermined CQI threshold the first transportation vehicle may transmit the second CQI if it has been measured at a later time than the first CQI, i.e., if a timestamp associated with the second CQI indicates that it is more actual than the first CQI and thus is of more interest for the third transportation vehicle than the first CQI. The first transportation vehicle may further transmit the second CQI if it is fresher than the first CQI and if it is determined that it is associated to the same critical area as the first one, where however the location of the critical area has changed since the measurement of the first CQI (see below).

According to the disclosed method, i.e., also in the embodiments described above, the first transportation vehicle does not transmit the first CQI or the second CQI to the third transportation vehicle if a difference between the first CQI and the second CQI is above a predetermined CQI threshold, wherein this CQI threshold may be above the second CQI threshold. In other words, if the second CQI indicates that a critical area does not persist at a location identical or nearby to the first location neither the first CQI is forwarded nor the second CQI is transmitted to the third transportation vehicle. Hence channel congestion is decreased.

In a further disclosed embodiment, the predetermined range about the first location that is allowable in a comparison with a second CQI is indicated in the first message.

Therein, the predetermined range might depend on a velocity of the second transportation vehicle while measuring the first CQI or might be based on multiple measurements of the second transportation vehicle, e.g., yielding the same results. In other words, the first CQI might be indicated in the first message itself to apply rather to a region (area) than to a specific location. Therein, such area (region) might also be indicated differently than by a location and a range about it, such as, e.g., by specifying the locations of a boundary of the region or by specifying an identifier of a base station of a communication network responsible for the coverage of that area or region. Then, any second CQI present in the first transportation vehicle for such area can be used for comparison.

In another disclosed embodiment, the predetermined range about the first location that is allowable in a comparison with a second CQI is determined based on a propagation direction and a velocity for the first position. Such propagation direction and a velocity for the first position may be indicated in the first message and might be determined by the second transportation vehicle based on several CQI measurements carried out in a critical area associated with the first location. Optionally, the predetermined range about the first location that is allowable in a comparison with a second CQI is determined based on an identifier of at least one other transportation vehicle associated with the first position and/or the first CQI. This is due to that critical areas are prone to be generated by moving clusters of other transportation vehicles using the same communication network infrastructure. Hence, a (moving) critical area might be also associated with the positions of one or more of such transportation vehicles. Hence, by knowing the identifier of such transportation vehicle, the first transportation vehicle can determine an actual position thereof and, based on such actual position, which second CQI value to use for comparison with a first CQI value.

As set forth above, the first transportation vehicle may transmit the second CQI if it is fresher than the first CQI and if it is determined that it is associated to the same critical area as the first one, where however the location of the critical area has changed since the measurement of the first CQI. In such disclosed embodiment, the first transportation vehicle thus may transmit the second CQI corresponding to the first CQI even if the second position is outside of the predetermined range. In other words, in such comparison the first transportation vehicle would determine that a second CQI exists that corresponds to the first CQI, e.g., by being related to the same moving transportation vehicle cluster, and that might still indicate a high channel load or a low quality of service, QoS. In such, forwarding the first CQI is not sensible as it relates only to a previous location of the critical area (the moving clusters of transportation vehicles), whereas the second CQI relates to a more recent position of the critical area and provides more valuable information to the third transportation vehicle.

As set forth above, in the disclosed method the first CQI may relate to a channel load and/or to a quality of service available via this channel. As further set forth above the channel may be one of a mobile bearer of a 4G or 5G LTE network or a WLAN bearer of a WLAN connection according to IEEE 802.11p standard. The disclosed method aims at decreasing channel congestion related to the transmission of service message. Hence, in a disclosed embodiment, the first message indicates that the first CQI relates to a channel load of above 80% of channel capacity, optionally of above 90% channel capacity.

In other words, a first message is only transmitted by the second transportation vehicle, i.e., received by the first transportation vehicle, if the channel load exceeds the above percentage of channel capacity. Hence, a first message is solely received if data transmission in an area previously referred to as critical area is indeed critical. Hence, the first message and, eventually, the second message enable the first transportation vehicle and the third transportation vehicle, respectively, to plan UL or DL data transmission such that data transmission in the critical area is avoided. The second CQI threshold hence may relate to a channel load below 80% of the channel capacity.

In a disclosed embodiment, the first message and/or the second message is a shared channel quality, SCQ, message configured to inform transportation vehicles that will pass a critical area with high channel load as described in detail in 19158381.4. The full content of which is hereby incorporated by reference. Optionally, the first message and/or the second message is a cooperative communication message, CCM, configured to comprise information on a channel as well as on surrounding structures that might have an impact on the channel quality as described in detail in 18184352.5. The full content of which is hereby incorporated by reference. However, for the disclosed method for selectively forwarding one of those messages their format is rather irrelevant.

In a further exemplary embodiment of the disclosed method, the first transportation vehicle does not transmits the first CQI and/or the second CQI to the third transportation vehicle if a distance between an actual position of the first transportation vehicle and the first position and/or the second position exceeds a predetermined distance threshold. In other words, the forwarding of a received first CQI and/or the transmitting of a determined second CQI is limited to a specific area around a first position and/or second position, i.e., the position of a previously detected critical area. This exemplary embodiment is based on the assumption that accuracy of the first or second CQI on any area further away than the predetermined distance threshold is limited anyway. The predetermined distance threshold is about 2 km, optionally about 3 km, and optionally about 5 km. Hence, the forwarding of the first CQI and/or the transmission of the second CQI is limited to a 5 km radius about critical area. Optionally, the predetermined distance threshold differs based on a In a further disclosed embodiment, the first transportation vehicle transmits the first CQI and/or the second CQI to the third transportation vehicle if the third transportation vehicle is outside of a transmission area of the second transportation vehicle, particularly only if the third transportation vehicle is outside of a transmission area of the second transportation vehicle. This condition may be applied additionally to the conditions discussed before. According to this disclosed embodiment, the first transportation vehicle will solely forward the first CQI to the third transportation vehicle, if the third transportation vehicle cannot receive the first CQI from the second transportation vehicle directly. Similarly, the first transportation vehicle will solely transmit the second CQI to the third transportation vehicle, if the third transportation vehicle cannot receive a first CQI from the second transportation vehicle. Optionally, the first transportation vehicle transmits the first CQI and/or the second CQI to the third transportation vehicle (only) if the third transportation vehicle is within the predetermined distance threshold about the first position and/or second position. In other words, the first transportation vehicle transmits the first CQI and/or second CQI to the third transportation vehicle only if the third transportation vehicle can make any use of the first CQI and/or the second CQI.

According to an exemplary embodiment, the first transportation vehicle does not transmit the first CQI if the first transportation vehicle did not determine a second CQI. In other words, if the first transportation vehicle did not itself determine channel quality information for a second location associated with a first location as described above, then the first transportation vehicle will not forward any first CQI received for such first location, as the first transportation vehicle is not able to confirm such first CQI. Thus, the comparison carried out will always yield a negative result due to the lacking input of a second CQI or due to the input of a second CQI indicating the situation, e.g., by being empty.

Another disclosed embodiment relates to a method of a second transportation vehicle for vehicle-to-vehicle, V2V, communication, which is interrelated with the method of the first transportation vehicle described above. The method of the second transportation vehicle may comprise determining first channel quality information, CQI, related to a first position. Optionally this comprises measuring a channel load of a channel of a communication network using transmission and/or reception of at least one reference signal. Optionally, the determination of a first CQI comprises at least one measurement of a received power of a signal received by the second transportation vehicle via a channel of a communication network, such as, e.g., a cellular network or a WLAN network. The first CQI may further comprise information on an error rate of the communication, such as, e.g., a packet error loss rate or a bit error rate. The first channel quality information, CQI, may further be configured similarly to a Quality of Service (QoS) Class Identifier, CQI, according to LTE-A but is however not limited to such an embodiment.

The method of the second transportation vehicle further comprises transmitting a first message to a first transportation vehicle, wherein the first transportation vehicle is within a transmission area of the second transportation vehicle, and wherein the first message comprises the first CQI. Therein, according to the disclosed method, the second transportation vehicle transmits the first message (only) if the second transportation vehicle and/or the first transportation vehicle is within a predetermined distance threshold about the first position. In other words, if a first transportation vehicle comes into the transmission area of the second transportation vehicle only after the second transportation vehicle moved away from the measurement of a first CQI indicating a critical area, e.g., a channel load of more than 80% of a channel capacity, the second transportation vehicle will not even send the first message comprising the first CQI, as it is assumed that this CQI is not relevant any longer and/or of no particular interest to the first transportation vehicle. By reducing the amount of transmitted first messages, a congestion of a channel used for such messages is avoided.

Another disclosed embodiment relates to a first transportation vehicle comprising a communication module that is configured to communicate with a second transportation vehicle and with at least one station of a communication network. The communication module may comprise further components to enable such communication with another transportation vehicle (i.e., an identical or similar communication module of another transportation vehicle) in the mobile communication system. Such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. These components may further be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, etc.

The first disclosed transportation vehicle further comprises a control unit that is connected to the communication module, particularly via respective interfaces, and that is configured to control the communication module to receive and transmit respective data. The control unit is configured to receive a message comprising first CQI information related to a first position (i.e., a first message) while being in a transmission area of the second transportation vehicle, to compare the received first CQI with a second CQI related to a second position, wherein the second CQI is determined by the first transportation vehicle and is further configured to selectively transmit a message comprising the first CQI and/or the second CQI to a third transportation vehicle in accordance with the comparison of the first CQI and the second CQI. In other words, the disclosed transportation vehicle is configured to act as a first transportation vehicle.

Another disclosed embodiment relates to a computer program comprising instructions which, when the program is executed by a control unit of a transportation vehicle, cause the control unit to carry out a method of a first transportation vehicle for V2V communication as set forth above and/or to carry out a method of a second transportation vehicle for V2V communication as set forth above.

Reference will now be made in detail to embodiments which are illustrated in the drawings. Effects and features of the exemplary embodiments will be described with reference to the accompanying drawings. Therein, like reference numerals denote like elements, and redundant descriptions are omitted. The present disclosure, however, may be embodied in various different forms, and should not be construed as being limited to only the illustrated embodiments herein. Rather, these disclosed embodiments are provided solely as examples for fully conveying the features of the present disclosure to those skilled in the art.

Accordingly, processes, elements, and techniques that are not considered necessary to those having ordinary skill in the art for a complete understanding of the features of the present disclosure may not be described. At the same time, within the drawings, the relative sizes of elements, layers, and regions may be exaggerated for clarity.

As used herein, the term "and/or" includes any and all combinations of one or more of the associated listed items. Further, the use of "may" when describing embodiments of the present disclosure refers to "one or more embodiments of the present disclosure." Further, in the following description of embodiments of the present disclosure, the terms of a singular form may include plural forms unless the context clearly indicates otherwise.

It will be understood that although the terms "first" and "second" are used to describe various elements, these elements should not be limited by these terms. These terms are only used to distinguish one element from another element. For example, a first element may be named a second element and, similarly, a second element may be named a first element, without departing from the scope of the present disclosure. As used herein, the term "and/or" includes any and all combinations of one or more of the associated listed items and expressions such as "at least one of" when preceding a list of elements, modify the entire list of elements.

As used herein, term as "substantially", and "about" are used as terms of approximation and not as terms of degree, and are intended to account for the inherent deviations in measured or calculated values that would be recognized by those of ordinary skill in the art. However, if the term "substantially" is used in combination with a feature expressed using a numeric value, the term "substantially" denotes a range of +/−5% of the value centered on the value.

Figure 1:
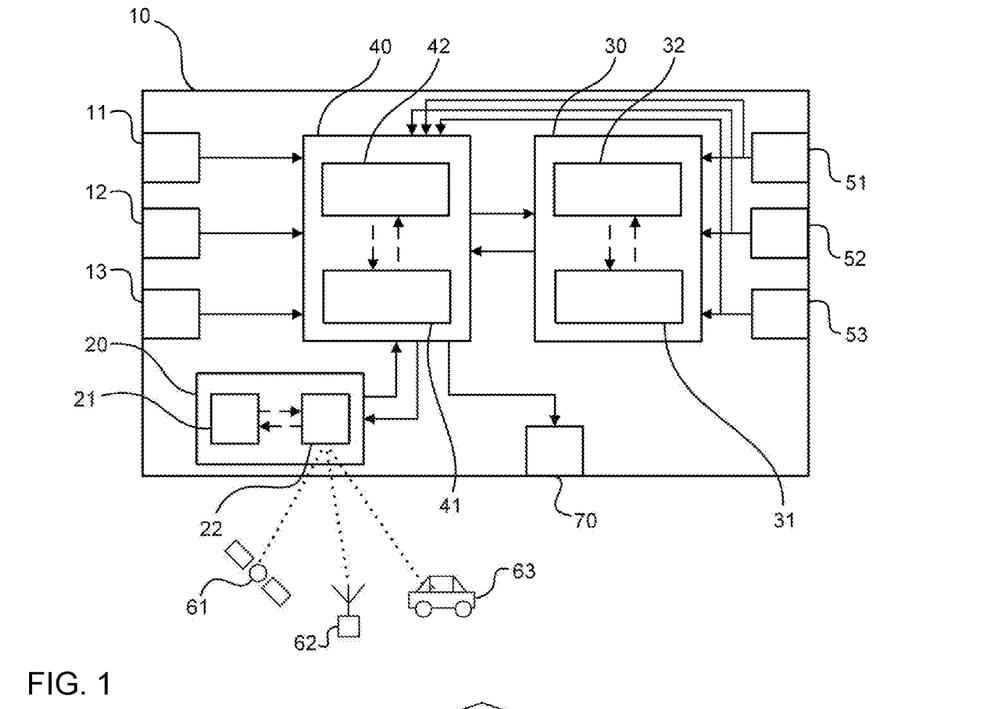
FIG. 1 schematically illustrates a transportation vehicle for performing the disclosed method.

FIG. 1 schematically illustrates an exemplary transportation vehicle 10, particularly a transportation vehicle with combustion, electric or hybrid motor. The transportation vehicle 10 comprises a multiple primary sensors, particularly a first sensor 11, a second sensor 12, and a third sensor 13. The primary sensors 11, 12, 13 are configured for detecting environmental information of the transportation vehicle and comprise, e.g., a camera for detecting images of a road upfront the transportation vehicle 10, distance sensors, such as, e.g., ultrasound-based sensors or LIDAR-based sensors, etc. The primary sensors 11, 12, 13 transmit the detected signals to a control unit 40 of the transportation vehicle 10.

The transportation vehicle 10 further comprises a plurality of secondary sensors, particularly a fourth sensor 51, a fifth sensor 52, and a sixth sensor 53. The secondary sensors 51, 52, 53 are configured for detecting information regarding the transportation vehicle 10 itself, particularly data regarding an actual position and motion state of the transportation vehicle 10. The secondary sensors 51, 52, 53 thus may comprise velocity sensors, acceleration sensors, tilt sensors, or the like. The secondary signals transmit the detected signals to the control unit 40 of the transportation vehicle 10.

The transportation vehicle 10 further comprises a communication module 20 with a memory and one or more transponders 22. The transponders 22 might be configured as radio, WLAN, GPS and/or BLUETOOTH® transponder or the like. The transponder 22 communicates with an internal memory 21 of the communication module, optionally via a suitable data bus. The communication module 20 is configured to perform V2V and (C-)V2X communication. The communication module 20 also communicates with the control unit 40. The communication module 20 is adapted for communicating messages according to the WLAN p communication system (IEEE 802.11p) and/or according to a LTE-V mode 4 communication system.

The transportation vehicle 10 further comprises a driving system 30 that is configured for performing fully or partially autonomous driving of the transportation vehicle 10, particularly for longitudinal and lateral control thereof. The driving system 30 comprises a navigation module 32 that is configured to determine a navigation route between a starting point and an end point input by a user. The driving system further comprises an internal memory 31, e.g., for map material, that communicates with the navigation module 32, e.g., via a suitable data bus. At least part of the secondary sensors 51, 52, 53 transmit their signals directly to the driving system 30, particularly including the actual position and movement information of the transportation vehicle 10.

The transportation vehicle further comprises a control unit 40 that is configured for performing the disclosed method as set forth in detail below. For performing this task and others the control unit 40 comprises an internal memory 41 and a CPU 42 that communicate with each other via a suitable data bus. Above that the control unit communicates with at least the primary sensors 11, 12, 13, the secondary sensors 51, 52, 53, the communication module 20 and the driving system 30, e.g., via one or more CAN, SPI, or other suitable connections.

Figure 2:
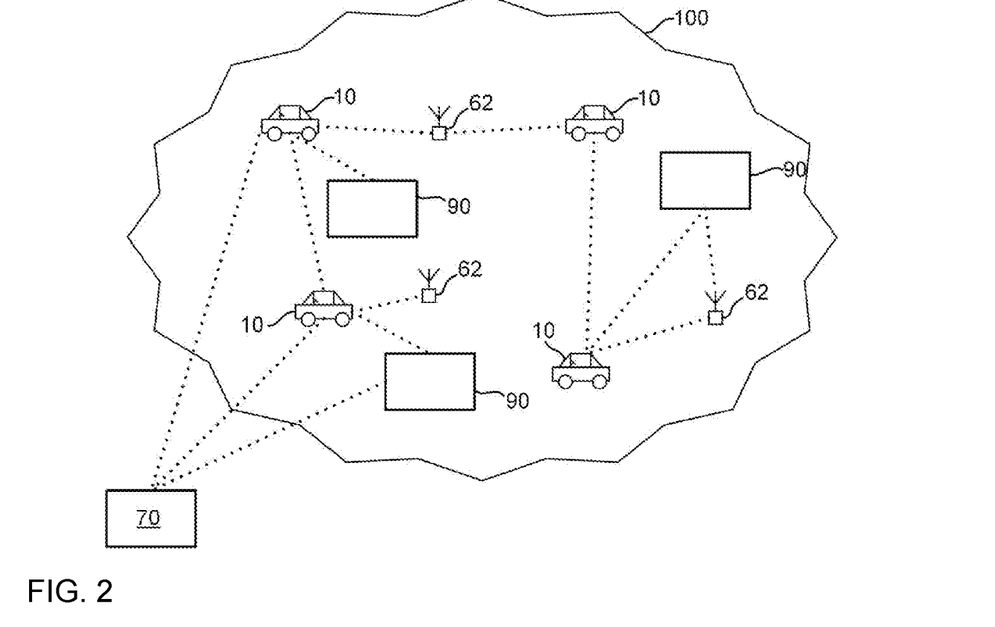
FIG. 2 schematically illustrates a smart environment for performing the disclosed method comprising the transportation vehicles of FIG. 1, base stations of a mobile communication network and road side units, RSUs.

FIG. 2 schematically illustrates a smart environment for performing the disclosed method comprising transportation vehicles as of FIG. 1, base stations 62 of a mobile communication network and a server 70 and road side units, RSUs, 90 operated by a transportation vehicle manufacturer.

In the system as shown in FIG. 2 communication, i.e., transmission, reception or both, takes place among transportation vehicles 10 directly and/or between transportation vehicles 10 and a network component, particularly a base station 62, a road side unit 90, and/or an application or back end server 70. The communication thus either utilizes a mobile communication system or vehicle-to-vehicle, V2V, communication. Therein, the base stations 62 are usually operated by a network operator of a mobile communication network while the road side units 90 might be operated by a transportation vehicle manufacturer or a service partner thereof. Further, the road side units 90 communicate with the server 70 that can also communicate directly with transportation vehicles 10.

The mobile communication system used for the V2V and/or the V2X communication may, for example, correspond to one of the Third Generation Partnership Project (3GPP)-standardized mobile communication networks, where the term mobile communication system is used synonymously to mobile communication network. The mobile or wireless communication system 400 may correspond to a mobile communication system of the 5th Generation (5G) and may use mm-wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Figure 3:
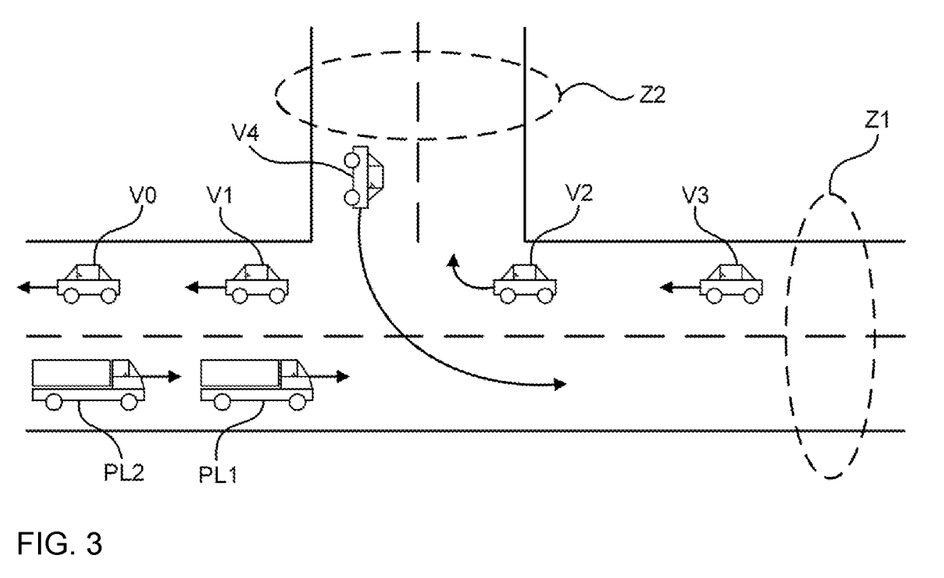
FIG. 3 illustrates an application case of the disclosed methods.

FIG. 3 illustrates an application case of a disclosed method, particularly of a method for V2V communication according to an exemplary embodiment.

According to the illustrated embodiment, two critical areas Z1 and Z2 exist along a road network, wherein in each of the critical areas the channel load for a mobile communication network as described above is high. With respect to FIG. 2, the channel load refers to a connection between one of the transportation vehicles illustrated in FIG. 3 with one of a mobile base station 62, a (backend) server 70 and a road side unit 90. Within the critical areas a channel load for a connection to one of the aforementioned entities is above 80% of a channel capacity and hence guaranteed quality of service, QoS, is poor in the regions Z1, Z2.

In the disclosed embodiment of FIG. 3, transportation vehicles V0, V1, V2, V3 and V4 are transportation vehicles 10, 62 that are configured for V2X and for V2V communication. Each of the transportation vehicles V0, V1, V2, V3 and V4 is a transportation vehicle according to an exemplary embodiment. Further, the transportation vehicles PL2, PL1 are trucks which are organized in a platoon and which are also configured for V2X communication. Also trucks PL2, PL1 might be configured as transportation vehicles of the disclosure. According to the illustrated embodiment, each of the transportation vehicles V0, V1, V2 and V3 has driven through a critical area Z1 with has a poor channel quality due to a high channel load.

The transportation vehicle V0 is the first transportation vehicle to drive through the critical area Z1 and to determine a first CQI related to a first position within the critical area Z1. Further, the transportation vehicle V0 transmits the first CQI via broadcast SCQ information concerning the critical area Z1. Transportation vehicle V0 transmits the SCQ message with a variable frequency between, e.g., 1 to 10 Hz, wherein the utilized frequency depends on a velocity and/or a position change of V0.

In consequence to this transmission, the transportation vehicle V1 receives the SCQ message from transportation vehicle V0, whereas the transportation vehicles V2, V3 and V4 do not receive any SCQ message from transportation vehicle V0 due to the limited communication range of the transmission of transportation vehicle V0.

In a first scenario, the transportation vehicle V1 also measured the critical area Z1 concerned in the SCQ message transmitted by the transportation vehicle V0, i.e., also detected a CQI indicating a high channel load for a location within the critical area Z1. According to this disclosed embodiment, transportation vehicle V1 determines that the SCQ message received from transportation vehicle V0 contains a first CQI on the critical area Z1 that corresponds to the CQI measured by transportation vehicle V1 itself for area Z1. In this case, transportation vehicle V1 forwards the SCQ message initially sent by transportation vehicle V0 to any other transportation vehicle capable of V2X and V2V communication that is outside of reception area of transportation vehicle V0. Further, transportation vehicle V1 will additionally or alternatively send the second CQI that itself has detected for critical area Z1, if the critical area Z1 has significantly changed in terms of channel conditions, i.e., channel load etc., in terms of position, or terms of speed etc. Transportation vehicle V1 might further consider whether information about critical area Z1 are relevant for the transportation vehicles detected outside a transmission range of transportation vehicle V0 and inside that of transportation vehicle V1.

However, in another scenario transportation vehicle V1 passed the critical area Z1 without measuring a second CQI that indicates a high channel load for a location within area Z1, which might be due to that the critical area Z1 does not exist anymore as a critical area, e.g., due to that channel load has significantly decreased since transportation vehicle V0 passed the critical area Z1. In such situation, although transportation vehicle V0 received the SCQ message from transportation vehicle V0, transportation vehicle V1 will neither forward the received SCQ message nor transmit an own SCQ message. This is based on that transportation vehicle V1 did not measure any critical areas on the way and that transportation vehicle V1 compares these own measurement of channel load with the SCQ message from transportation vehicle V0.

With respect to the further transportation vehicles illustrated in FIG. 3, the following scenarios might occur. The transportation vehicle V2 is out of a transmission range of the transportation vehicles V0 and V1. Hence, the transportation vehicle V2 does not receive any SCQ messages from transportation vehicles V0 and V1 independent of the existence of a critical area Z1. Transportation vehicle V2 will rather just receive messages from transportation vehicle V4 about a critical area Z2. However, as transportation vehicle V2 did not pass critical area Z2 itself, it will not forward this SCQ message received from transportation vehicle V4 although it might consider it for its own data DL and UL scheduling. Further, transportation vehicle V2 will send a SCQ message regarding the critical area Z1 insofar it was still critical when the transportation vehicle V2 passed the critical area Z1. This message might be received by transportation vehicles V3 and V4 depending on their distance to transportation vehicle V2.

In a possible scenario, transportation vehicle V3 receives a SCQ message transmitted from transportation vehicle V2. In consequence, the transportation vehicle V3 performs a method that is similar to that described with respect to transportation vehicle V1 that received a SCQ message from transportation vehicle V0. In short, transportation vehicle V3 forwards the SCQ message by broadcasting it, if it also detected a critical area Z1 and if it detects another transportation vehicle within its transmission range but outside of a transmission range of transportation vehicle V2.

In a further possible scenario transportation vehicle V4 receives SCQ messages from transportation vehicle V1 and from transportation vehicle V2. Although transportation vehicle V4 might consider the SCQ messages, particularly the information on a critical area Z1 therein, for its own data UL or DL scheduling (particularly due to receiving to SCQ messages with same or similar content from different transportation vehicles), it will not forward the received SCQ messages as itself is not able to confirm the critical area Z1.

Further, transportation vehicle V4 will broadcast an own SCQ message regarding the critical area Z2, which will be received by transportation vehicle V2 as well as by transportation vehicle V3. In reaction to receiving the SCQ message of transportation vehicle V4, transportation vehicle V2 will determine whether an intended route passes through critical area Z2. Therein, the determination of an intended route might be based on, e.g., a navigation route based on a user input of a target location and/or by a detection of a direction indicator turned on by a user of transportation vehicle V2. As it determines that its intended route passes critical area Z2, the transportation vehicle V2 will consider the SCQ message received by transportation vehicle V4 for its data UL or DL. In the same manner transportation vehicle V3 determines that its intended route does not pass critical area Z2 and will thus not consider the SCQ message received by transportation vehicle V4.

According to the illustration of FIG. 3, also transportation vehicles PL1 and PL2 have received the SCQ message from transportation vehicle V1 and, based on a determination carried out at least by platoon leader PL1 that an intended route of the platoon will cross critical area Z2, will consider the SCQ message for the UL and DL data scheduling. Further, transportation vehicle PL1 adapts the platooning application parameters utilized in the platoon at least by transportation vehicle PL2, e.g., by increasing the distance to be kept by transportation vehicle PL2 with respect to transportation vehicle PL1 to account for that also V2V might be impeded by the high channel load in critical area Z1 and thus communication of information from platoon leader PL1 to transportation vehicle PL2, e.g., about a braking manoeuvre, might be impeded within the critical area Z1 or at least delayed for a time span. The additional distance might account for the consequence of such delay at an actual speed of the platoon.

Further, the transportation vehicles PL1 and PL2, particularly platoon leader PL2, will prompt further transportation vehicles V2, V3 coming into a transmission range of transportation vehicles PL1 and PL2 about information about critical area Z1 or will at least compare information received from further transportation vehicles V2, V3 with the SCQ information received by transportation vehicle V1. If transportation vehicle PL1 does not receive any SCQ message from transportation vehicle V2 and/or V3 regarding critical area Z1, it might assume that the channel load in critical area Z1 is not above a certain threshold anymore. In response thereto, transportation vehicle PL1 might again adopt the UL or DL data scheduling and may again change a distance to the following transportation vehicles PL, both, e.g., by setting initial parameters again.

The electronic or electric devices and/or any other relevant devices or components according to embodiments described herein, except those described explicitly as hardware, may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. The electrical connections or interconnections described herein may be realized by wires or conducting elements, e.g., on a PCB or another kind of circuit carrier. The conducting elements may comprise metallization, e.g., surface metallizations and/or pins, and/or may comprise conductive polymers or ceramics. Further electrical energy might be transmitted via wireless connections, e.g., using electromagnetic radiation and/or light. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like.

A person of skill in the art should recognize that the functionality of various computing devices may be combined or integrated into a single computing device, or the functionality of a particular computing device may be distributed across one or more other computing devices without departing from the scope of the exemplary embodiments. Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly defined so.

REFERENCE SIGNS 10 transportation vehicle
11 first sensor
12 second sensor
13 third sensor
20 communication module
21 memory
22 transceiver
30 driving system
31 memory
32 CPU
40 control unit
41 memory
42 CPU
51 fourth sensor
52 fifth sensor
53 sixth sensor
61 GPS satellite
62 base station
63 other transportation vehicle
70 backend server
90 road side unit
V0, V1, V2, V3, V4 passenger transportation vehicles
PL1, PL2 platoon transportation vehicles

The invention claimed is:

1. A first transportation vehicle comprising
a communication module to communicate with a second transportation vehicle and with a station of a communication network; and
a control unit configured to:
receive, within a transmission area of the second transportation vehicle, a message comprising first channel quality information (CQI) related to a first position;
compare the received first CQI with a second CQI related to a second position, wherein the second CQI is determined by the first transportation vehicle, and wherein the second position is identical to the first position or within a predetermined range about the first position; and
selectively transmit a message comprising the first CQI to a third transportation vehicle based on the comparison of the first CQI and the second CQI, the selection comprising determining a difference between the first CQI and the second CQI relative to a first predetermined CQI threshold,
selectively transmit a message comprising the second CQI to the third transportation vehicle based on the comparison of the first CQI and the second CQI, the selection comprising determining a difference between the first CQI and the second CQI relative to a second predetermined CQI threshold.

2. A method of a first transportation vehicle for vehicle-to-vehicle (V2V) communication, the method comprising:
receiving, within a transmission area of the second transportation vehicle, a first message from a second transportation vehicle comprising first channel quality information (CQI) related to a first position indicated in the message;
comparing the first CQI with a second CQI related to a second position, wherein the second CQI is determined by the first transportation vehicle; and
wherein the second position is identical to the first position or within a predetermined range about the first position,
wherein the first transportation vehicle transmits the first CQI to a third transportation vehicle in response to a difference between the first CQI and the second CQI being below a first predetermined CQI threshold and wherein the first transportation vehicle transmits the second CQI to the third transportation vehicle in response to a difference between the first CQI and the second CQI being below a second predetermined CQI threshold.

3. The method of claim 2, wherein the first transportation vehicle does not transmit the first CQI or the second CQI to the third transportation vehicle in response to a difference between the first CQI and the second CQI being above a predetermined CQI threshold.

4. The method of claim 2, wherein the predetermined range is indicated in the first message or determined based on a propagation direction and a velocity for the first position and/or based on an identifier of at least one other transportation vehicle associated with the first position and/or the first CQI.

5. The method of claim 4, wherein the first transportation vehicle transmits the second CQI corresponding to the first CQI in response to the second position being outside the predetermined range.

6. The method of claim 2, wherein the first message indicates that the first CQI relates to a channel load of above 80% of channel capacity.

7. The method of claim 2, wherein the first message and/or the second message is one of a shared channel quality (SCQ) message and/or a cooperative communication message (CCM).

8. The method of claim 2, wherein the first transportation vehicle does not transmit the first CQI and/or the second CQI to the third transportation vehicle in response to a distance between an actual position of the first transportation vehicle and the first position and/or the second position exceeds a predetermined distance threshold.

9. The method of claim 2, wherein the first transportation vehicle transmits the first CQI and/or the second CQI to the third transportation vehicle in response to the third transportation vehicle being outside of a transmission area of the second transportation vehicle.

10. The method of claim 2, wherein the first transportation vehicle does not transmit the first CQI in response to the first transportation vehicle not determining a second CQI.

11. A non-transitory computer readable medium including a computer program comprising instructions which, when the program is executed by a control unit of a transportation vehicle, cause the control unit to carry out a method of a first transportation vehicle for vehicle-to-vehicle (V2V) communication with a second transportation vehicle, the method comprising:
receiving, within a transmission area of the second transportation vehicle, a first message from a second transportation vehicle comprising first channel quality information (CQI) related to a first position indicated in the message;
comparing the first CQI with a second CQI related to a second position, wherein the second CQI is determined by the first transportation vehicle; and
selectively transmitting a second message comprising the first CQI to a third transportation vehicle based on the comparison of the first CQI and the second CQI, the selection comprising determining a difference between the first CQI and the second CQI relative to a first predetermined CQI threshold,
selectively transmitting a third message comprising the second CQI to the third transportation vehicle based on the comparison of the first CQI and the second CQI, the selection comprising determining a difference between the first CQI and the second CQI relative to a second predetermined CQI threshold,
wherein the second position is identical to the first position or within a predetermined range about the first position.

12. A non-transitory computer readable medium including a computer program comprising instructions which, when the program is executed by a control unit of a first transportation vehicle, cause the control unit to carry out a method of a second transportation vehicle for vehicle-to-vehicle (V2V) communication, the method comprising:
determining first channel quality information (CQI) related to a first position; and
transmitting a first message to a first transportation vehicle within a transmission area of the second transportation vehicle, the first message comprising the first CQI,
wherein the second transportation vehicle transmits the first message in response to the second transportation vehicle and/or the first transportation vehicle being within a predetermined distance threshold about the first position,
transmitting the first CQI to a third transportation vehicle in response to a difference between the first CQI and a second CQI being below a first predetermined CQI threshold and transmitting the second CQI to the third transportation vehicle in response to a difference between the first CQI and the second CQI being below a second predetermined CQI threshold.

13. A method for communication between a first, a second, and a third transportation vehicle, for vehicle-to-vehicle (V2V) communication, the method comprising:
determining first channel quality information (CQI) related to a first position; and
transmitting a first message to a first transportation vehicle within a transmission area of the second transportation vehicle, the first message comprising the first CQI,
wherein the second transportation vehicle transmits the first message in response to the second transportation vehicle and/or the first transportation vehicle being within a predetermined distance threshold about the first position,
wherein the first transportation vehicle transmits the first CQI to a third transportation vehicle in response to a difference between the first CQI and a second CQI being below a first predetermined CQI threshold, and
wherein the first transportation vehicle transmits the second CQI to the third transportation vehicle in response to a difference between the first CQI and the second CQI being below a second predetermined CQI threshold.

* * * * *